J. H. THESIER.
TIRE CLEAT.
APPLICATION FILED OCT. 21, 1914.

1,274,211.

Patented July 30, 1918.

Witnesses:

Joseph H. Thesier,
Inventor

By Attorneys

UNITED STATES PATENT OFFICE.

JOSEPH H. THESIER, OF SYRACUSE, NEW YORK.

TIRE-CLEAT.

1,274,211.　　　　　Specification of Letters Patent.　　Patented July 30, 1918.

Application filed October 21, 1914. Serial No. 867,728.

*To all whom it may concern:*

Be it known that I, JOSEPH H. THESIER, a citizen of the United States, residing at Syracuse, in the county of Onondaga and State of New York, have invented a certain new and useful Tire-Cleat, of which the following is a specification.

This invention has for its object a particularly simple and efficient tire cleat especially applicable for heavy motor vehicles as trucks, and the like, and one of the principal features thereof is a particularly simple and efficient construction whereby the cross piece can be removed or placed in position.

In describing this invention, reference is had to the accompanying drawings, in which like characters designate corresponding parts in all the views.

Figure 1:
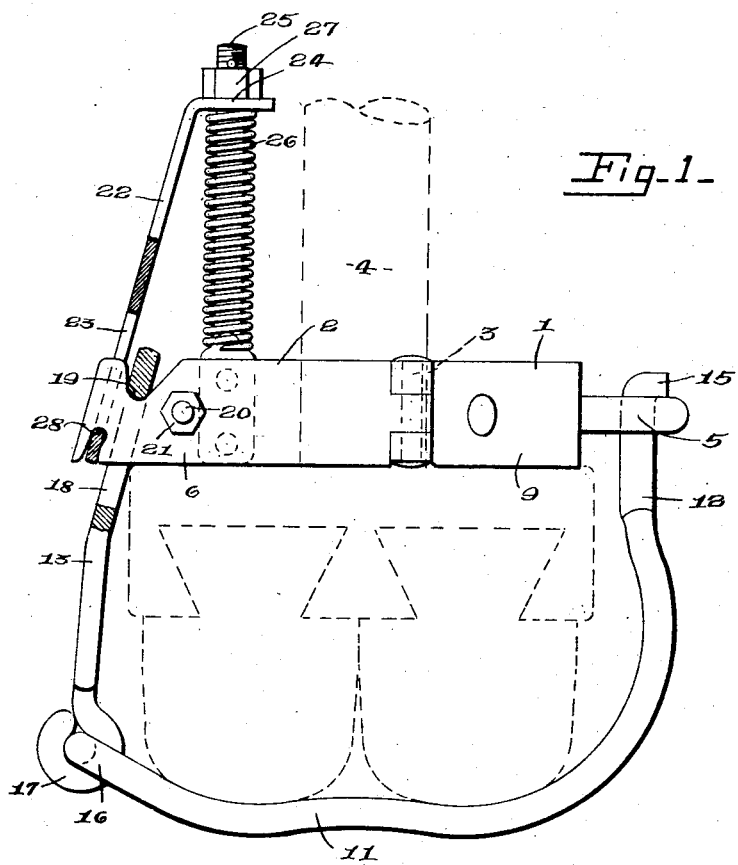
Figure 1 is an elevation of a preferable form of this tire cleat, the contiguous portions of a wheel with its tire being indicated in section in dotted lines.
Figure 2:
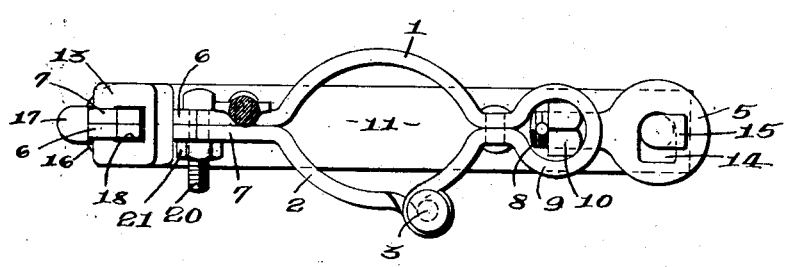
Fig. 2 is a plan view of the body of the tire cleat.

This invention comprises generally a body for attachment to the body of a wheel, and a cross piece for extending across the tire of the wheel and having means at its opposite ends which are substantially rigid therewith with respect to radial movement of the cross piece, which means is slidably connected to the cleat body to yield radially.

The body is here shown as composed of a main member 1 and a clamping member 2, hinged at 3 thereto, said members being shaped to engage the spoke 4 of a wheel between them, and the main member 1 having an eye 5 associated therewith at one end, and the members having lapping portions 6, 7, at its other end, the eye 5 and the lapping portions 6, 7 being located on opposite sides of the wheel.

The eye 5 is shown as provided with a stem 8 extending through a looped portion 9, of the member 1 and as held in position by a nut 10 screwing on the stem 8 within the loop 9. The hinge 3 is here shown as located at the end of this loop 9.

11 is the cross piece which is a rigid bar. 12 is an arm rigid with the bar 11 and connected thereto at one end, and at its other end to the cleat body. 13 is an arm or link hinged at the other end of the cross piece and connected to the end of the cleat body opposite to that the arm 12 is connected to.

The arm 12 is formed with means for interlocking with the eye 5, and as here shown the passage 14 of the eye 5 is non-circular or what might be termed a button-hole, and the arm 12 has a head or button 15 of the same contour as the passage 14, which head or button moves through said passage when properly positioned, and interlocks or buttons when turned after being passed through said passage.

The link 13 is a hasp hinged to the cross piece 11 by means of interlinked eyes 16, 17 provided respectively on the cross piece 11 and the link 13; and said link is provided with a slot 18 at its other end for receiving the lapping portions 6, 7 of the cleat body. The slot 18 is long enough to permit a limited radial movement of the link 13, and the body 1 is provided with a notch 19 in its inner edge with respect to the center of the wheel, into which the link 13 has a latching action, after the slot has been passed over the lapping portions 6, 7.

The link 13 may serve to temporarily hold the members 1, 2 together, but preferably means is provided for holding the members 1, 2 of the cleat body permanently clamped on the spoke 4, said means being here shown as a bolt 20 extending through the lapping portions 6, 7 and a nut 21 screwing on the bolt.

22 is a spring pressed locking member or latch for holding the link 13 from detachment from the cleat body, the locking member being in the form of a strap having a slot 23 at one end for receiving the lapping portions 6, 7 of the cleat body, and having a bearing 24 at its other end movable on a rod 25 rising from the main member 1 of the body. A spring 26 is interposed between the bearing 24 and the cleat body, the spring tending to press the bearing 24 against a nut 27 on the end of the rod 25 and to hold the slotted end thereof engaged with the cleat body.

The latch 22 is designed to overlie a portion of the hasp link 13; the body is formed with a notch 28 located in the outer side thereof with respect to the center of the wheel and laterally to the outer side of the position occupied by the link 13, and the locking member 22 has a latching action with this notch 28 and is held in its latched position by the spring 26.

In operation, the cleat body can be adjusted to the proper position along the spoke 4 and when once placed in position on the spoke is intended to be permanently attached to the spoke, although it can be readily detached by removing the bolt and nut 20, 21. Any desired number of cleat bodies may be placed on a wheel. When it is necessary to use cleats, the cross pieces 11 with their attaching parts can be taken from the tool box and the arm 12 of each with its head 15 interlocked or buttoned into one of the eyes 5, and when the head 15 is buttoned or interlocked with the eye 5, the hasp link 13 is in position to be passed over the lapping portions 6, 7 of the cleat body. Before the hasp link can be placed over the body, the latch 22 is disengaged from the body by depressing the latch against the action of its spring 26 to disengage said member 22 from the slot 28. When the latch is disengaged, the hasp link 13 is passed over the lapping members 6, 7 of the cleat body so that it latches into the notch 19. The locking member is then engaged with the lapping members 6, 7 of the cleat body.

Should one of the cross pieces break, the part thereof connected to the rod 12 will turn in such direction that the head of the rod 15 will come into the alinement with the eye 10 and the arm 12 and contiguous portion of the cross piece 11 will become detached.

What I claim is:

1. A tire cleat comprising a body for attachment to the body of the wheel, the cleat body having means at one end formed with a non-circular passage, a cross piece having an angular arm at one end, the free end of the arm being movable through the passage and provided with a non-circular head for moving through the passage and for interlocking with the contiguous part of the body when passed entirely through the passage, and means connecting the other end of the cross piece to the cleat body, substantially as and for the purpose specified.

2. A tire cleat including a body for attachment to the body of the wheel, a cross piece having an angular arm at one end, the cleat body and the arm having means which interlock by a successive endwise and turning movement of the arm and means connecting the other end of the cross piece to the cleat body, substantially as and for the purpose set forth.

3. A tire cleat comprising a body for attachment to the body of a wheel, a cross piece for extending crosswise of the tire, the cross piece having an angular arm rigid therewith at one end and connected at its free end to the cleat body to slide radially, and a link hinged to the other end of the cross piece to move laterally relatively thereto and having a lengthwise slot for receiving a portion of the cleat body, the slot being longer than the dimension of the portion of the cleat body therein for permitting radial sliding movement of the link, and means for locking the link in engagement with the cleat body, substantially as and for the purpose described.

4. A tire cleat comprising a body for attachment to the body of the wheel, the cleat body having an eye formed with a non-circular passage, a rigid cross piece for extending across the tire having an angular arm at one end rigid therewith, the free end of the arm being movable through the passage and provided with a head of substantially the same contour as the passage for moving through the same and for interlocking with the contiguous part of the body when passed entirely through the passage, and a means connecting the other end of the cross piece and the cleat body, said means being rigid with the cross piece with respect to radial movement and having an elongated slot for receiving the body, the slot being longer than the dimension of the portion of the cleat body therein, substantially as and for the purpose specified.

5. A tire cleat comprising a body for attachment to the body of a wheel, a cross piece for extending across the tire, the cross piece having an angular arm at one end, the arm being connected at its free end to the cleat body, a link hinged to the other end of the cross piece and movable into interlocking engagement with the cleat body, the link being in the form of a hasp hinged at one end to the cross piece, and having its other end provided with a slot for receiving the cleat body, and locking means for holding the hasp engaged with the cleat body, and comprising a spring pressed latch carried by the body and having a slot for receiving the cleat body, one end of the latch overlying the hasp link, substantially as and for the purpose described.

6. A tire cleat comprising a body for attachment to the body of a wheel, a cross piece for extending across the tire, the cross piece having an angular arm at one end, the arm being connected at its free end to the cleat body, and a link at the other end of the cross piece, movable into interlocking engagement with the cleat body, the link being in the form of a hasp hinged at one end to the cross piece, and having its other end provided with a slot for receiving the cleat body, and locking means for holding the hasp engaged with the cleat body, and comprising a spring pressed latch carried by the body and having a slot for receiving the cleat body, one end of the latch overlying the hasp link, the cleat body being formed with notches in opposite edges thereof, into which the latch and the link enter, respectively, substantially as and for the purpose specified.

7. A tire cleat comprising a body for attachment to the body of a wheel, the body being formed with a projecting rod rigid therewith, a cross piece for extending across the tire, the cross piece being connected at its opposite ends to the body, said means including a member movable into and out of interlocking engagement with the cleat body, and means for locking said member engaged with the cleat body comprising a member having a bearing mounted on the rod and movable along the same, and a spring encircling the rod and interposed between the cleat body and said bearing, substantially as and for the purpose set forth.

8. A tire cleat comprising a body for attachment to the wheel body, the body comprising a main member and a clamping member hinged thereto and being shaped to engage a spoke of the wheel, the main member being formed with an eye at one end of the body, and said members being formed with lapping portions at the other side of the body, a cross piece for extending across the tire, having means at one end for connecting the same to said eye, means connecting the other end of the cross piece and the body, the latter means including a link having a slot for receiving the lapping portions of the cleat body, and locking means carried by the main member of the body and including a part formed with a slot for engaging the lapping portions of the body and overlying the link, substantially as and for the purpose described.

In testimony whereof, I have hereunto signed my name in the presence of two attesting witnesses, at Syracuse, in the county of Onondaga, and in the State of New York, this 23rd day of September, 1914.

JOSEPH H. THESIER.

Witnesses:
S. DAVIS,
J. H. GLAZIER.

Copies of this patent may be obtained for five cents each, by addressing the "Commissioner of Patents, Washington, D. C."